Figure 1:
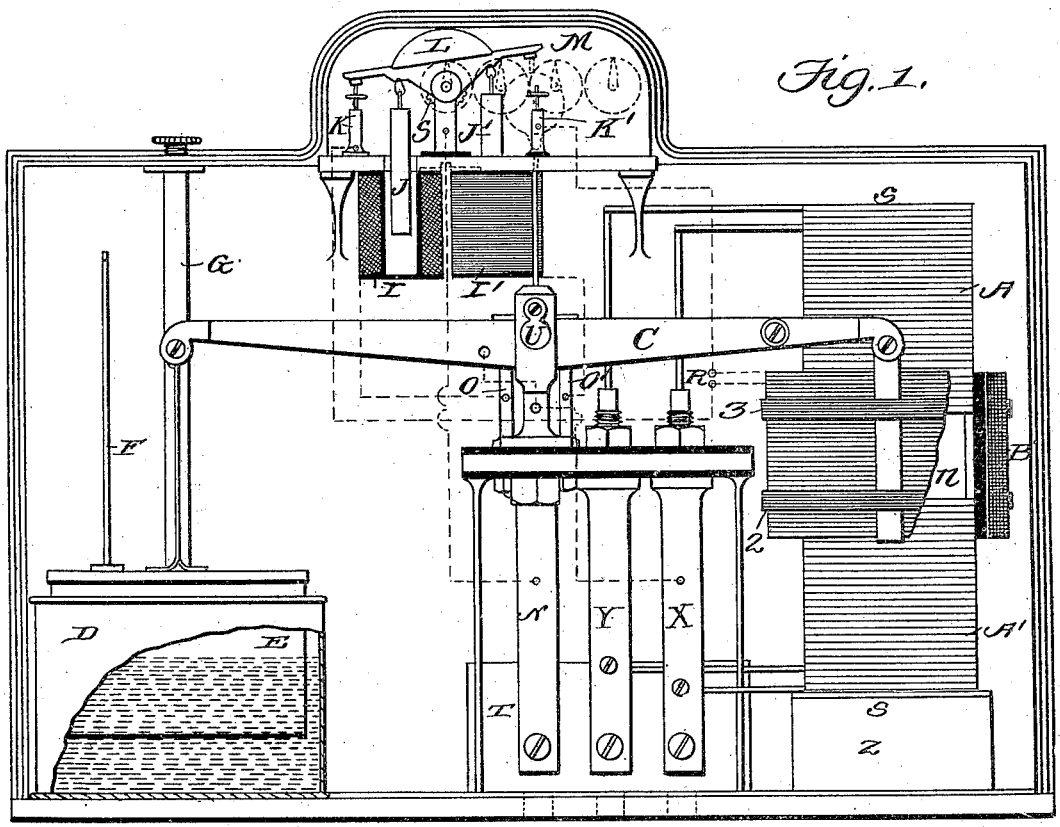

No. 688,650. Patented Dec. 10, 1901.
R. KENNEDY.
APPARATUS FOR MEASURING ELECTRICAL ENERGY.
(Application filed Feb. 21, 1901.)
(No Model.) 2 Sheets—Sheet 1.

Witnesses:
C. J. Kesler
Dennis Sumby

Inventor
Rankin Kennedy
By James L. Norris
Atty

No. 688,650. Patented Dec. 10, 1901.
R. KENNEDY.
APPARATUS FOR MEASURING ELECTRICAL ENERGY.
(Application filed Feb. 21, 1901.)

(No Model.) 2 Sheets—Sheet 2.

Witnesses:
C. D. Kesler.
Dennis Sumby.

Inventor
Rankin Kennedy
By
James L. Norris
Atty

UNITED STATES PATENT OFFICE.

RANKIN KENNEDY, OF LEEDS, ENGLAND.

APPARATUS FOR MEASURING ELECTRICAL ENERGY.

SPECIFICATION forming part of Letters Patent No. 688,650, dated December 10, 1901.

Application filed February 21, 1901. Serial No. 48,344. (No model.)

*To all whom it may concern:*

Be it known that I, RANKIN KENNEDY, electrical engineer, a subject of the King of Great Britain and Ireland, residing at 89 Gathorne Terrace, in the city of Leeds, England, have invented certain new and useful Improvements in Apparatus for Measuring Electrical Energy, of which the following is a specification.

My invention relates to improvements in apparatus for measuring electrical energy supplied to consumers; and the object of my improvements is to provide much simpler and more accurate methods than have heretofore been in use for the purpose and which may be used with either continuous or alternating currents of electricity.

My invention consists in the adaptation of a balance-dynamometer to the measurement of current supplied. For this purpose the electrical energy passing through the dynamometer and operating at one end of the balance-beam is balanced against a fluid resistance at the other end of the beam and is made to oscillate the balance-beam to and fro, the current of electricity in the shunt-coil being for this purpose reversed at the extremity of each oscillation of the beam; and my invention further consists of the method of providing and applying such fluid resistance.

There are various ways in which my invention can be put into practice; but the method I prefer is as follows: The movable coil of a dynamometer is the shunt-coil. I use two fixed coils in line with each other with like poles facing each other, but with a polar space between them. The fixed coils are in series with the consumption-circuit, so that the forces operating to oscillate the balance are proportional to the current of electricity passing. The fluid resistance acting in opposition to the dynamometer is so constructed that it opposes forces proportional to those of the dynamometer, and hence the number of oscillations of the balance-beam in a given time is directly proportional to the amount of electrical energy passed during that time. By recording the number of oscillations of the balance-beam a correct record is obtained of the electrical energy which has passed through the dynamometer. The fluid resistance consists, preferably, of a vessel for holding water or other fluid, (hereinafter called the "container,") into which is inverted a smaller vessel, (hereinafter called the "air-holder,") hung at one end of the balance-beam, with its mouth dipping into the fluid, so as to be sealed thereby, and a very fine tube communicating with the interior of the air-holder at one end and open to the air outside the container at the other end, so that air may thereby enter into or flow out of the air-holder; but instead of an air-holder such as just described a bellows may be used with sides made of thin gutta-percha, leather, or rubber, as in a dry gas-meter. The dimensions of the air-holder, the fine tube, and the dynamometer-coils are so proportioned that each oscillation of the beam is equal to a unit or fraction of a unit or several units of electrical energy, according to the capacity of meter required. In action whenever the dynamometer urges the beam the air-holder is either sunk lower into the fluid or lifted upward in it at a rate proportional to the flow of air through the fine tube, and therefore proportional to the forces pushing or pulling it down or up.

By means of my improvements the accuracy and sensitiveness of the balance are applied to the measurement of current supplied, there is great simplicity and absence of friction in the apparatus employed, and the advantages of exceedingly slow movement, as one oscillation of the beam per hour is enough for most purposes.

To render my apparatus equally applicable for continuous and alternating currents, the several coils are as far as possible free from all metallic parts.

I carry out my invention by the means hereinbefore and hereinafter described, and illustrated in the accompanying drawings, in which—

Figure 3:
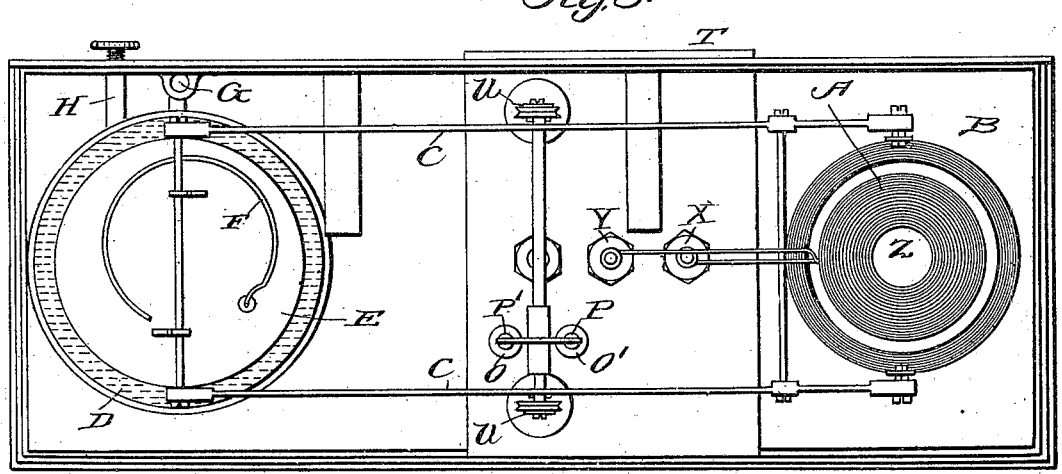
Figure 2:
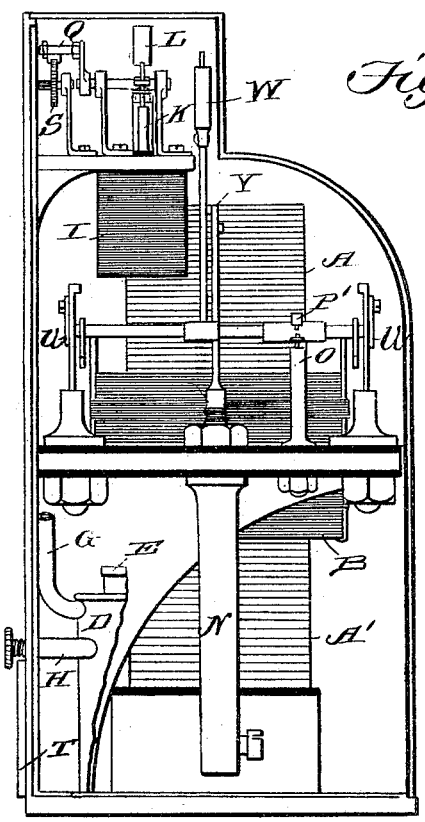
Figure 4:
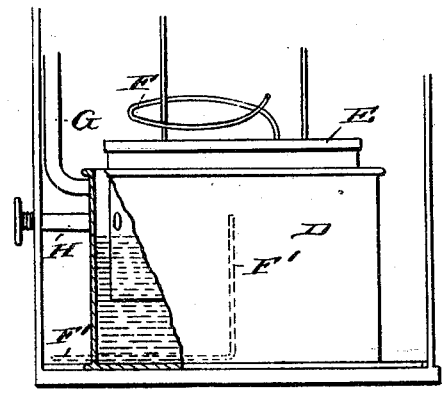

Figure 1 is a side elevation of my improved apparatus. Fig. 2 is an end elevation with the air-resistance brake partly cut away. Fig. 3 is a plan with the top removed. Fig. 4 is an end view of the air-brake, showing the filling, overflow, and air-resistance tubes.

The same reference character refers to the same part in the different figures.

A and A' are two dynamometer-coils connected to terminals X and Y, so that the electric current supplied to the consumer passes uninterruptedly through the said coils. X is the inlet-terminal, and Y the outlet-terminal, for the consumer's current. The coils A and A' are of insulated wire wound upon a non-conducting core or bobbin Z. The direction of the currents flowing in them is opposite to each other, forming an n pole in the middle and an s pole at each outer end. A space is left between the two n poles. The space is equal to the length of the movement of the reciprocating coil B, next mentioned. B is the pressure or shunt coil and is made, preferably, twice the length of the said space in order to reduce the mutual induction between it and the fixed coils A A'. Its diameter is such as to allow it to pass freely over the ends of the fixed coils. The coil is hung on one end of the balance-beam C, to which it is attached by metal hangers bound on by silk cord, as at 2 and 3. It is electrically connected to a current-reverser or pole-changer, so that its polarity may be reversed at the end of each swing of the beam. The coil may be a single coil, and its polarity may be changed by an ordinary reversing commutator or switcher operated automatically by a current; but I prefer to employ a double-wound coil with two equal coils wound side by side. The beginning of one coil is joined to the finishing end of the other, and the junction is electrically connected to the balance-beam C, and the balance-beam is electrically connected to the positive terminal X, as shown by dotted lines in Fig. 1. The two free ends are attached to flexible wires and are respectively joined at R by wire connections to insulated contact-pins K and K', forming part of the pole changing or reversing mechanism.

The balance-beam C is preferably made double, as seen in plan in Fig. 3, and is balanced on knife-edges and kept free from lateral movement by the flap-pieces U. (Seen in Figs. 1, 2, and 3.) On the axis of the beam is a cross-arm provided with contact-pieces P P to make contact with one or the other of the contact-pins O O' at the end of each oscillation of the beam, and thereby operate the pole-changer, and I regulate the length of the swing of the beam by adjusting the height of the pins O O', so making them act as stops.

The pole-changer consists of the rocking cantaliver L, operated by two solenoids I I', which act on iron plungers or cores J J', hung on the cantaliver. The solenoids are ordinary fine-wire shunt-coils on non-conducting bobbins.

To operate the pole-changer and at the same time stop the beam C at the end of each swing, two insulated contact-pins O O' are provided, standing beneath the contact-pieces P P' and connected by wires to the solenoids I I' of the pole-changer. These solenoids are joined in series, and the junction is joined together with the cantaliver L to the negative terminal N. The balance-beam C being connected to the terminal X, it results that on every oscillation of the balance-beam one or other of the contact-pieces P P' will rest upon one of the contact-pins O O' and a current will be sent through one or other of the solenoids I I', thus pulling over the cantaliver L. When the cantaliver L rests on K, the current flows in in one coil in B, and B moves in one direction. When the cantaliver is thrown over into contact with K', the current flows in the other coil and in the opposite direction in B, and then B moves in a direction contrary to that first mentioned. In this way a reciprocating motion is imparted to the shunt-coil B.

The parts D, E, and F together constitute the air resistance or brake which governs the time taken by each swing of the beam. D is a container for holding the water or other fluid to act as a seal to E. E is the smaller vessel or air-holder, inverted into D, with its mouth under the level of the fluid in D. E is attached to and is operated by the beam C. F is an air-tube through which all air admitted into or expelled from E must pass, but intended to offer a resistance to its passing. The tube F is a fine tube of glass or metal, shown as straight and vertical in Fig. 1 and as bent or horizontal in Figs. 3 and 4 and in each case as fixed on the vessel E; but instead of being so fixed it may be fixed in the container, in which case it will be bent at right angles, and the one end will pass through the sides of the container and the other end will stand up in the center of the container above the fluid-level, as shown by dotted lines in Fig. 4 at F' F'. The air-holder E will be filled with or emptied of air on each reversal of the balance-beam C.

The dynamometer-coil being generally heavier than the air-holder some additional weight must be added to balance the latter against the coil on the balance-beam, and seeing also that the weight of the air-holder on the beam varies in proportion as the vessel is more or less immersed in the fluid and in order to compensate for this variation I use a weight W, adjustably secured to a vertical arm (a bridge-piece may be used instead) on the balance-beam, so that as the beam descends on the air-holder side this weight is gradually added to that of the air-holder as it sinks in the fluid, while on the reverse motion the weight is gradually subtracted as the air-holder rises in the fluid. The beam itself should also be weighted at or near its center sufficiently to prevent lifting.

The air-tube should be practically uniform and smooth in bore throughout and should be of such length in proportion to its diameter that its resistance to the passage of air shall be constant. I have discovered that there is a length of tube for any diameter of bore at which the resistance of the tube is constant— that is to say, that it offers the same proportional resistance whatever the pressure on the air may be.

To ascertain the most suitable length of tube, I proceed as follows: I cut the tube rather long to begin with. I then raise the air-holder E to its highest position on the balance-beam, and placing a known small weight on the vessel E, I note the time taken by the beam to descend to its lowest position. I then note the time taken for the same excursion when a weight ten times greater is put on E. If the tube is constant in resistance, the time occupied will be as many times less as the weight is greater. If the product of time multiplied by weight is greater at small weight than at greater weight, then the tube is too long, and it must be cut down until this product is constant. If it comes out greater at high pressures, then the tube is too short and a longer one must be taken.

An inlet-pipe G, Figs. 1, 2, 3, and 4, is attached to the container for filling fluid into it; also, an outlet-pipe H for letting out any excess of fluid, so as to keep the fluid-level constant.

T is a door giving access to the terminals X Y N.

A train of index-wheels M (such as are usual in meters) is provided for registering the quantity of current supplied. The train is operated once for every up-and-down movement of the balance-beam by means of an arm fixed behind but on the same shaft on the cantaliver L, which arm carries a pawl Q, which takes into a ratchet-wheel S, the first wheel of the index-train. The motive force for operating the index-train is supplied by magnets or solenoids, preferably those of the pole-changer.

There are three adjustments whereby the oscillation of the beam may be brought accurately to the desired number per hour per unit—first, by adjusting the bore of the tube; second, by adjusting the diameter of the air-holder E, and, third, by placing a variable electric resistance in the circuit of coil B and varying the said resistance until the desired velocity is arrived at. One or all of these may be made use of, but the third is necessary. The beam and terminals are insulated, as shown by thick black lines, as also are the pins K K' O O' and cantaliver L.

What I claim as my invention, and desire to secure by Letters Patent, is—

1. In an electric meter, a dynamometer-coil, and mechanism shiftable by said coil, said mechanism including an air-containing vessel, and an air-tube communicating with the interior of said air-containing vessel and governing the rate of movement of said coil.

2. In an electric meter and in combination with a plurality of dynamometer-coils, a movable or shunt coil, a balance-beam operable by said shunt-coil, a fluid-containing vessel, a second vessel inverted in said fluid-containing vessel and shiftable by said balance-beam, a current-reversing mechanism, and a resistance-tube communicating with the interior of said second vessel for the ingress and egress of air thereinto and therefrom and thereby controlling the oscillation of said balance-beam.

3. In an electric meter, a reciprocatory dynamometer, a pair of vessels, one inverted in the other, mechanism operative with said inverted vessel for governing said dynamometer, and an air-tube communicating with said inverted vessel.

4. In an electric meter, a dynamometer-coil, a shiftable air-containing vessel, an air-tube communicating with the interior of said vessel, and means between the air-containing vessel and the dynamometer, governed by the former and shiftable by the latter.

5. In an electric meter, a plurality of dynamometer-coils and a shunt-coil reciprocative thereby, a member shiftable by said shunt-coil, an air-containing vessel operable with said reciprocative member, and an air-tube communicating with the interior of said vessel.

6. In an electric meter, a dynamometer, a balance-beam, a shunt-coil to which said balance-beam is connected and operable, a fluid-containing vessel, a second vessel inverted in the other one, and an air-tube communicating with the interior of said second vessel.

7. In an electric meter, a dynamometer-coil, and mechanism shiftable by said coil, said mechanism including an air-containing vessel of variable capacity, and an air-tube communicating with said vessel, said vessel being closed to the atmosphere except through said tube.

In testimony whereof I have hereunto set my hand in presence of two subscribing witnesses.

RANKIN KENNEDY.

Witnesses:
 THO. DALTON,
 HERBERT L. LONDON.